United States Patent [19]

Nonami et al.

[11] Patent Number: 5,266,863
[45] Date of Patent: Nov. 30, 1993

[54] PIEZOELECTRIC ACTUATOR

[75] Inventors: Mitsuharu Nonami; Katsumi Shibata; Masashi Tsukihana; Noriyoshi Machida; Yukinori Kawamura, all of Kanagawa, Japan

[73] Assignee: Fuji Electric Co., Ltd., Kanagawa, Japan

[21] Appl. No.: 951,014

[22] Filed: Sep. 25, 1992

[30] Foreign Application Priority Data

Sep. 26, 1991 [JP] Japan .................. 3-274507
Oct. 21, 1991 [JP] Japan .................. 3-301121

[51] Int. Cl.⁵ .......................................... H01L 41/08
[52] U.S. Cl. .................................................. 310/339
[58] Field of Search ........ 310/321, 323, 328, 330–332, 310/339

[56] References Cited

U.S. PATENT DOCUMENTS

| | | | |
|---|---|---|---|
| 2,836,738 | 5/1958 | Crownover | 310/328 |
| 2,916,578 | 12/1959 | Crownover | 310/328 |
| 3,940,637 | 2/1976 | Ohigashi et al. | 310/339 |
| 3,976,899 | 8/1976 | Fanshawe | 310/339 |
| 4,581,506 | 4/1986 | Bai et al. | 310/339 |

FOREIGN PATENT DOCUMENTS 61-77221(A) 4/1986 Japan .
2-148531(A) 6/1990 Japan .

*Primary Examiner*—Mark O. Budd
*Attorney, Agent, or Firm*—Finnegan, Henderson, Farabow, Garrett & Dunner

[57] ABSTRACT

A piezo-electric actuator, comprising a flat spring having a plurality of arched side beams, the arched side beams having first and second ends, a central beam having first and second ends and top and bottom surfaces and disposed between the arched side beams, a fixed first end portion connecting the first end of the central beam with the first ends of the plurality of arched side beams, and a free second end portion connecting the second ends of the central beam with the second ends of the plurality of second arched side beams, wherein the arched side beams and the central beam are parallel to each other, and a piezo-electric element affixed to the bottom surface the central beam.

8 Claims, 9 Drawing Sheets

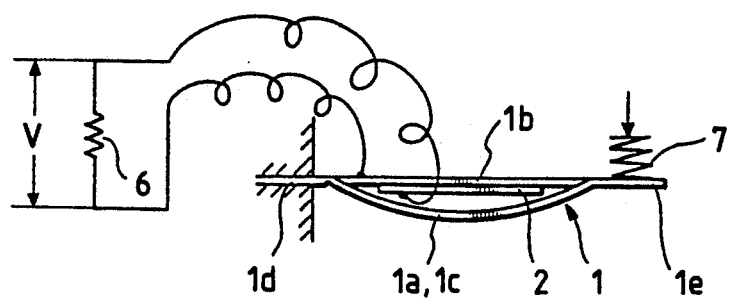
FIG. 3
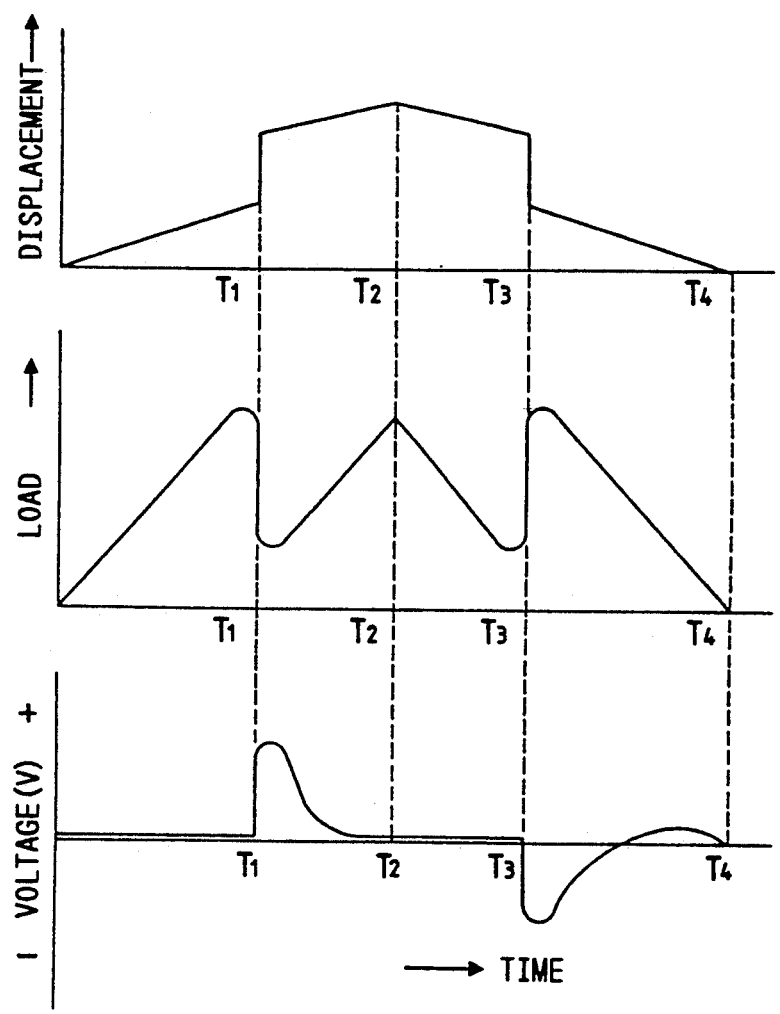
FIG. 4(A)
FIG. 4(B)
FIG. 4(C)

PIEZOELECTRIC ACTUATOR

BACKGROUND OF THE INVENTION

1. Field of the Invention

The present invention relates to an actuator using a piezo-electric element and particularly relates to an actuator in which a large force is obtained at a large displacement point.

2. Discussion of the Related Art

In a control board or the like using a programmable controller, in many cases, an input signal from an operation switch is not required to be continuous but may be a pulse signal. For such a use, an element for generating a pulse signal in response to an operation may be used as a switch in place of a conventional push-button switch or the like having a mechanical contact.

Additionally, it is known that a piezo-electric element generates an electric charge when an external force is applied thereto. If this phenomenon is utilized, the pulse signal can be generated without supplying any external electric power.

In order to obtain a pulse signal by utilizing a piezo-electric element, it is necessary to apply instantaneous strain to the piezo-electric element. When a piezo-electric actuator consists solely of a piezo-electric element, it is necessary to separately provide a mechanism for converting a gradually-changing switch operation force into a impact force. As a result, the whole configuration becomes complicated and expensive.

Further, fluid pressure (oil pressure, air pressure, etc.), or an electromagnet is widely used as a drive source for an actuator for applying an operating force to various equipment. Recently, however, an actuator utilizing deflection generated when a voltage is applied to an piezo-electric element, such as piezo-electric ceramics or the like (hereinafter, referred to as a piezo-electric actuator), has been developed. The piezo-electric actuator has various advantages, such as increasing response speed, generating no noise, and reducing the required size and load.

Generally, the generation force of an actuator using fluid pressure is constant independently of the displacement of an operating end portion. The generation force of an actuator using an electromagnet, on the other hand, becomes maximum at the maximum displacement point because the maximum displacement point is the same as the point where the needle is attracted by the stator.

In a piezo-electric actuator, however, there has been a problem in that, since the generation force in the piezo-electric element during deflection becomes smaller as the quantity of displacement thereof becomes larger, a large force cannot be obtained at a large displacement point. Conventionally, therefore, a mechanism for enlarging a load has been separately provided because it is difficult to independently use the piezo-electric actuator.

SUMMARY OF THE INVENTION

The present invention has been made in view of the above circumstances and has an object to provide an piezo-electric actuator having a simple structure in which a pulse voltage can be produced from a piezo-electric element by instantaneously deflecting the piezo-electric element without converting the external force into an impact force.

Another object of the present invention is to provide a piezo-electric actuator in which a large operating force can be obtained even at a large displacement point.

To achieve the objects and in accordance with the purpose of the invention, as embodied and broadly described herein, the piezo-electric actuator of this invention comprises a flat spring having a plurality of arched side beams, the arched side beams having first and second ends, a central beam having first and second ends and top and bottom surfaces and disposed between the arched side beams, a fixed first end portion connecting the first end of the central beam with the first ends of the plurality of arched side beams, and a free second end portion connecting the second end of the central beam with the second ends of the plurality of second arched side beams, wherein the arched side beams and the central beam are parallel to each other, and a piezo-electric element affixed to the bottom surface the central beam.

In another embodiment of the invention, arched beams curved in directions opposite to each other are provided on the opposite sides of a straight beam and piezo-electric elements polarized in directions opposite to each other are affixed on opposite surfaces of the straight beam respectively, so that an actuator in which a bi-directional operation can be performed is obtained.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention. In the drawings.

FIG. 3 is a side view showing the attachment of the piezo-electric actuator of FIG. 1 to a fixed wall and a voltage generator;

FIGS. 4(A)–4(C) are diagrams showing the relation between time and displacement, time and load, and time and voltage when the piezo-electric actuator of FIG. 3 has been deflected;

DESCRIPTION OF THE PREFERRED EMBODIMENTS

A flat spring having a "snap action characteristic" can be formed by connecting opposite ends of arched beams to opposite ends of a straight beam. When a load is applied to a flat spring so as to gradually deflect the flat spring, a "snap action characteristic" occurs when the ratio of displacement to the load suddenly increases when the deflection has reached a certain point (a snap action point).

If a piezo-electric element is affixed to the straight beam, or laminated piezo-electric elements are so affixed, and an external force acts on the flat spring so as to gradually deflect the flat spring, the quantity of deflection of the flat spring suddenly increases at a moment when the deflection has reached the snap action point, and the bending strain of the piezo-electric element affixed to the flat spring also increases impulsively. At that time, a charge corresponding to the strain is generated in the piezo-electric element and the thus generated charge produces a pulse voltage.

When a voltage is applied to the piezo-electric element to thereby deflect it, the spring force of the flat spring which has gone against the generation load of the piezo-electric element is inverted and added to the load of the piezo-electric element at the moment when the quantity of deflection of the flat spring integrally curved with the piezo-electric element has reached the snap action point. Therefore, a larger force than solely using a piezo-electric element can be obtained.

Next, embodiments of the present invention will be described with reference to FIGS. 1 through 6.

Figure 1:
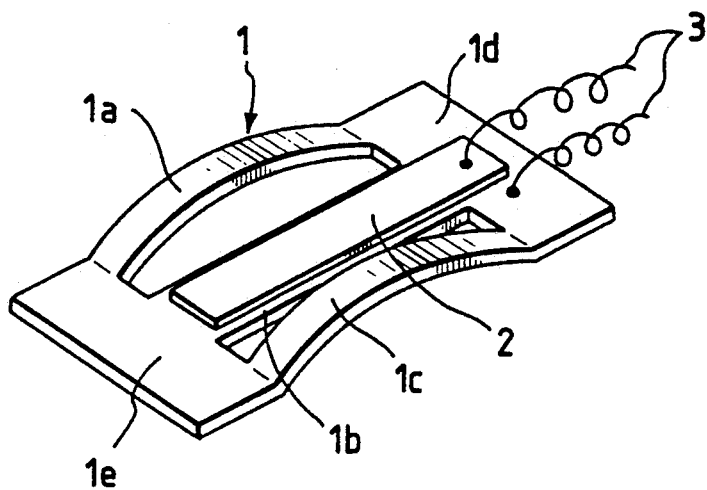
FIG. 1 is a perspective view showing an embodiment of the present invention.

FIG. 1 is a perspective view showing the piezo-electric actuator. In FIG. 1, the reference numeral 1 designates, for example, a 0.22 mm-thick phosphor-bronze flat spring having a structure in which three parallel beams 1a through 1c are connected at their opposite ends through connection portions 1d and 1e. The central beam 1b is straight, while the beams 1a and 1c on both sides of the beam 1b are arched in the same direction.

The reference numeral 2 designates, for example, a rectangular piezo-electric element having a thickness of 0.3 mm, a width of 3 mm, and a length of 30 mm. The piezo-electric element 2 is affixed to the top of the central beam 1b by an adhesive. The piezo-electric element 2 is formed by cutting off a piezo-electric sheet on the opposite surface of which electrodes of a conductive material are printed. Lead wires 3 are connected to the respective electrodes.

Figure 2A:
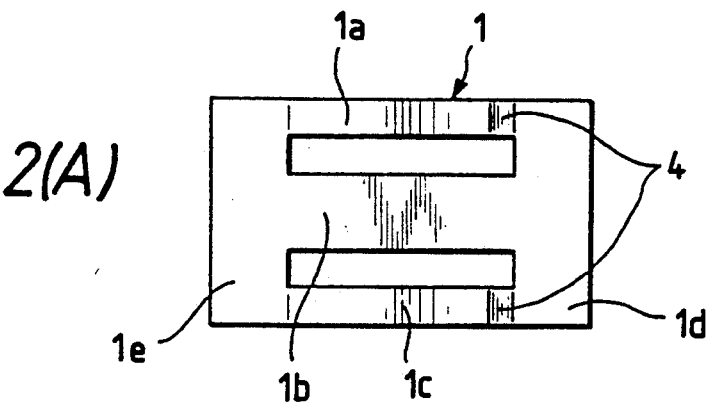
FIGS. 2(A) and 2(B) are plan and side views for explaining the method of forming the flat spring of FIG. 1.
Figure 2B:
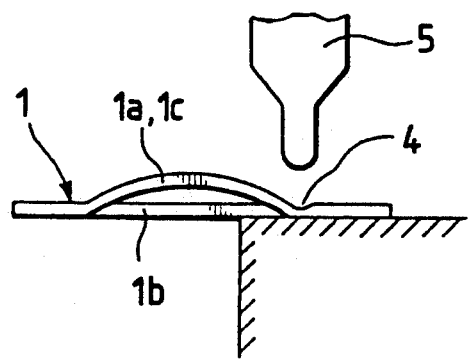

FIGS. 2(A) and 2(B) show a method for curving the beams 1a and 1c of the flat spring 1. When the flat spring 1 is formed by punching a plate material by means of a press, the whole surface is uniformly flat. Next, the flat surface is subjected to plastic deformation so that respective end portions of the beams 1a and 1c are transversely punched by means of a punch 5 while the end portions 4 are supported on a brace to thereby elongate each of the beams 1a and 1c so as to be longer than beam 1b. As a result, beams 1a and 1c are arched between the connection portions 1d and 1e.

After the piezo-electric element 2 is bonded on the flat spring 1 which has been subjected to curving, lead wires 3 are soldered and an insulating coating is applied on either the whole surface or only the piezo-electric element portion. The piezo-electric element 2 may be bonded on the flat spring 1 before curving the beams 1a and 1c.

As shown in FIG. 3, the piezo-electric actuator of FIG. 1 is fixed at its one end 1d and a load is applied to the other end 1e in the direction of an arrow to thereby deflect the flat spring and the piezo-electric element 2. Compressive strain is generated in each section of the piezo-electric element 2 integrally connected with the flat spring 1, so that a charge is generated on the electrodes. The reference numeral 6 designates a discharge resistor for outputting the generated charge as a voltage, and reference numeral 7 is a compression spring for applying a load to connection portion 1e.

FIG. 4 illustrates the displacement, load, and voltage characteristics when the piezo-electric actuator of FIG. 3 is deflected. FIG. 4 (A) shows a change in time of the displacement of the load applied to end portion 1e, and FIG. 4(C) shows a change in time of the voltage across the discharge resistor 6.

When a load is applied so as to increase the displacement gradually from zero in FIG. 4(A), the load gradually increases corresponding to the displacement as shown in FIG. 4(B). Although the piezo-electric element 2 generates a charge during this displacement, the generated charge is immediately discharged if the discharge resistor 6 is suitably selected, and therefore only a small voltage is detected (FIG. 4(C)).

In the above displacement, beams 1a and 1c are gradually lifted in the direction opposite to the curved side, that is, toward the upper portion in FIG. 3, so as to be deflected. Then, when the deflection reaches the snap action point after time $T_1$, the beams 1a and 1c are inverted to the opposite position at a point beyond the beam 1b. Therefore, the generation load on the flat spring 1 suddenly decreases. Since the spring force corresponding to the load immediately before the inversion has been stored in the compression spring 7, however, the displacement suddenly increases before the spring force and the load at that point of time are balanced with each other. As a result, a large compressive strain is instantaneously generated in the piezo-electric element 2 so that a pulse voltage appears in the discharge resistor 6.

Thereafter, although the load in the element increases as the displacement increases again until time $T_2$ is reached, the charge is successively discharged in this period so that a detected voltage is very small. If the load is made small after the time $T_2$, the displacement reaches the snap action point again after time $T_3$ so that the beams 1a and 1c are inverted to the initial position, that is, downward in FIG. 3, so that the load in the element suddenly increases. Therefore, the load application end 1e is lifted up while suddenly compressing the compression spring 7 to thereby suddenly decrease the displacement. As a result, the compressive strain of the piezo-electric element 2 instantaneously decreases so that a pulse voltage having a polarity opposite to that in the period of increasing load is generated. Further, if there exists a residual charge in the period of generation of a positive pulse at that time, the peak value decreases corresponding to the residual charge. Then, when the load becomes zero after time $T_4$, the piezo-electric actuator is returned to the initial state of FIG. 3.

In an experiment, a piezo-electric actuator was prepared in a manner such that a PZT piezo-electric element 3 mm in width, 30 mm in length and 0.3 mm in thickness was bonded on a flat spring composed of a phosphorous plate 0.3 mm in thickness. When the prepared piezo-electric actuator was deflected manually by hand, a signal having a peak voltage of 10 V and rise time of 10 ms was obtained. At this time, the electrostatic capacity of the piezo-electric element was 15 nF and the discharge resistance of the same was 1 MΩ.

The breaking time is determined in accordance with the time constant of CR as well as a generated charge due to the strain thereafter.

Figure 5A:
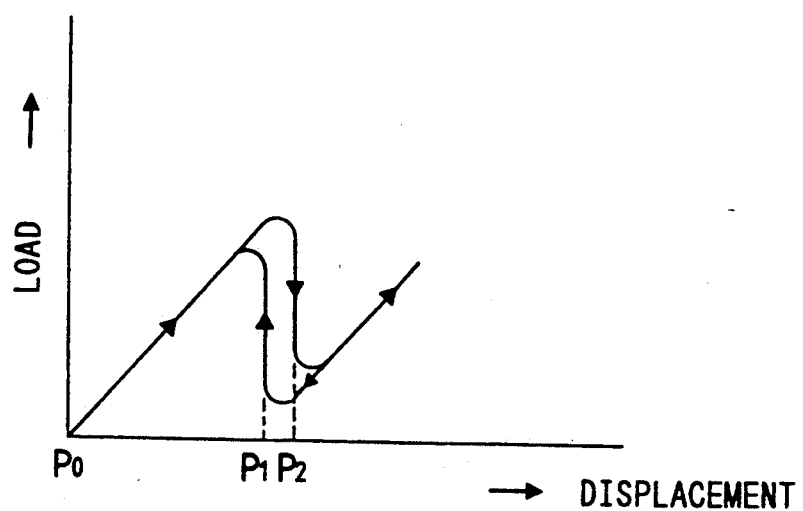
FIGS. 5(A) and 5(B) are diagrams showing the relation between the displacement and load when the piezo-electric actuator of FIG. 1 is deflected where the quantity of curve of each of the arched beams is relatively small (FIG. 5(A)) and where the quantity of curve is large (FIG. 5(B))
Figure 5B:
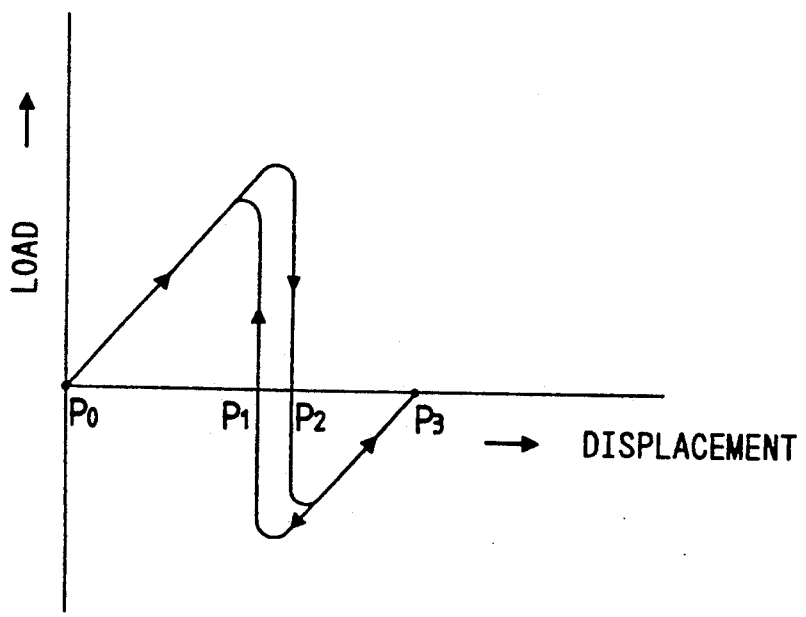

FIG. 5 shows the situation of the piezo-electric actuator of FIG. 1 at the time of deflection in terms of the relation between displacement and load. FIG. 5(A) shows the case where the quantity of curve of each of the beams 1a and 1c is relatively small and FIG. 5(B) shows the case where the value is relatively large.

In case (A), the quantity of curve corresponds to the case described with reference to FIG. 4. In this case, there appears a monostable characteristic in which after a snap action point P has been passed, a load in the same direction remains successive, and when the load is removed, the pulse generation element returns automatically to its initial position $P_O$. In this case, the snap action point has hysteresis so that the snap action point comes to the point $P_1$ at the time of increasing the load, while it comes to the point $P_2$ at the time of decreasing the load.

In the case (B) where the quantity of curve is large, there appears a bistable characteristic in which the load in the element is inverted at a point of time when the snap action point P is passed, and if the load is removed here, stabilization is realized at a point $P_3$ opposite to the initial position $P_O$. Also in this case, the snap action point has hysteresis so that the snap action point comes to the point $P_1$ at the time of increasing the load, while it comes to the point $P_2$ at the time of decreasing the load.

Figure 6A:
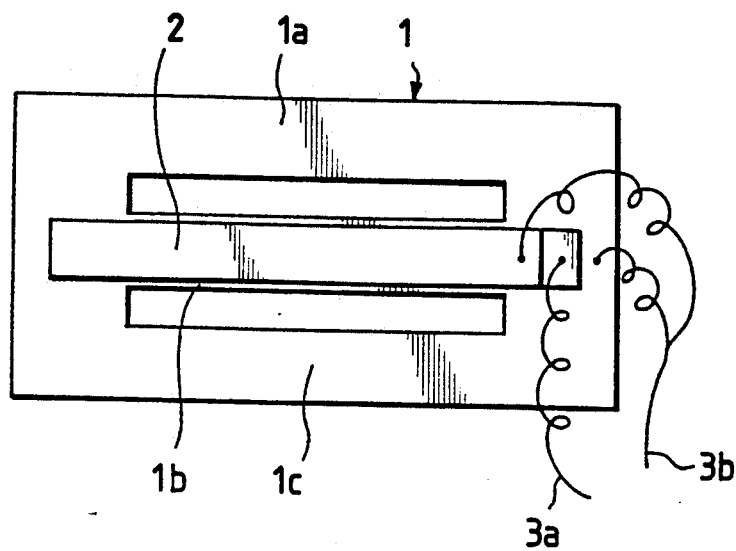
FIGS. 6(A) and 6(B) are plan and side views of another embodiment of the present invention.
Figure 6B:
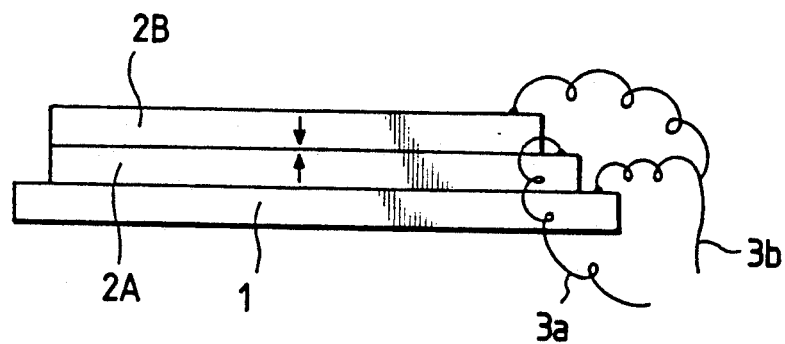

FIGS. 6(A) and 6(B) are plan and side views of another embodiment of the present invention. In this embodiment, laminated piezo-electric elements 2A and 2B are affixed to the flat spring 1 for the purpose of increasing the quantity of charge generated. The piezo-electric elements 2A and 2B are made opposite to each other in direction of polarization as shown by arrows in FIG. 6(B) so that a substantially doubled voltage is obtained across lead wire 3a connected to a counter electrode and 3b commonly connected between electrodes on the opposite sides. The number of piezo-electric elements in lamination may be three or more.

As described above, each of the piezo-electric actuators according to the illustrated embodiments has a structure in which the piezo-electric element 2 is bonded on the straight beam 1b of the flat spring 2 which is made to have a snap action characteristic by the arched beams 1a and 1c, and in which instantaneous strain is applied to the piezo-electric element 2 by an external force gradually changed to thereby make it possible to obtain a pulse signal by the snap action of the flat spring 1.

In each of the illustrated embodiments, if the quantities of curve of the beams 1a and 1c of the flat spring 1 are different from each other, a two-step snap-action operation is realized so that two pulse signals can be obtained in one stroke. Further, only one of the beams may be curved, or the number of curved beams may be selected to be three or more and the snap action points may be made different with respect to the curved beams.

Further embodiments will be described with reference to FIGS. 7 to 18.

Figure 7:
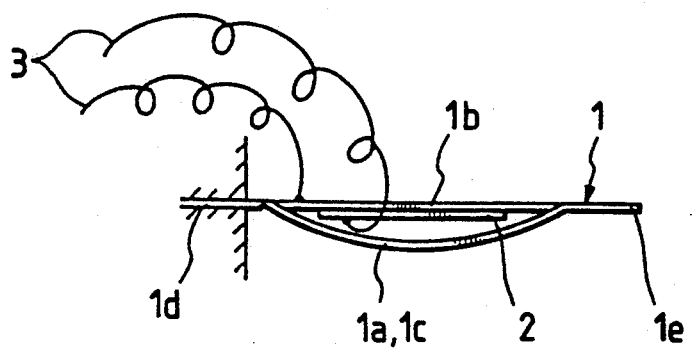
FIG. 7 is a side view showing the actuator of FIG. 1 fixed at one end.

If a voltage having an electric field which is coincident in direction with the polarization is applied to the piezo-electric element 2 with one end 1d of the piezo-electric actuator of FIG. 1 fixed and with the other end 1e made free as shown in FIG. 7, the piezo-electric element 2 expands in the direction of thickness (the vertical effect) and contracts in the longitudinal direction (the horizontal effect). Since the piezo-electric element 2 is restricted at its surface bonded on the flat spring 1, only the free surface opposite to the restricted one contracts so that the piezo-electric element 2 is curved to the contracted side. As a result, the flat spring 1 which is integrally provided with the piezo-electric element 2 also curves to the side in which the beams 1a and 1c are curved (downward in FIG. 7) and the free end 1e is displaced downward. If the free end 1e is used as an operating end portion, the operating force and displacement can be taken out from this portion.

In this case, beams 1a and 1c are gradually bent upward in FIG. 7 in the process of curving the flat spring 1, and when the quantity of bending reaches a certain point, beams 1a and 1c are inverted at a stretch. This point is called a snap action point.

Figure 8:
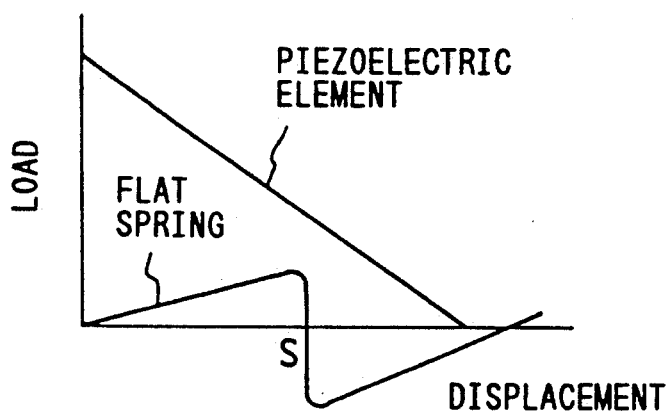
FIG. 8 is a characteristic diagram showing the relation between displacement and load with respect to the piezo-electric element and the flat spring upon application of a voltage to the actuator of FIG. 7.

FIG. 8 is a characteristic diagram showing the relation between the displacement of the piezo-electric element 2 and the flat spring 1 at their free ends when a voltage is applied to the piezo-electric element 2, and the load (the operation force) generated by the piezo-electric element 2, and the load by which the flat spring 1 goes against the piezo-electric element 2.

As shown in the drawing, the generation load of the piezo-electric element 2 becomes maximum at a point of zero displacement where the free end is restricted while the voltage is applied. The displacement becomes maximum at a point where the free end is released, and the generation load becomes zero.

The load on the flat spring 1, on the other hand, becomes larger as the deflection increases, and the direction of this load is opposite to the load of the piezo-electric element 2 before the snap action point is reached. Then, when the snap action point is reached, the direction of the load is inverted so as to be the same as that of the piezo-electric element 2. The flat spring 1 is stable as it is in the curved state when the free end is released. At this point, the displacement becomes maximum and the load becomes zero.

Figure 9:
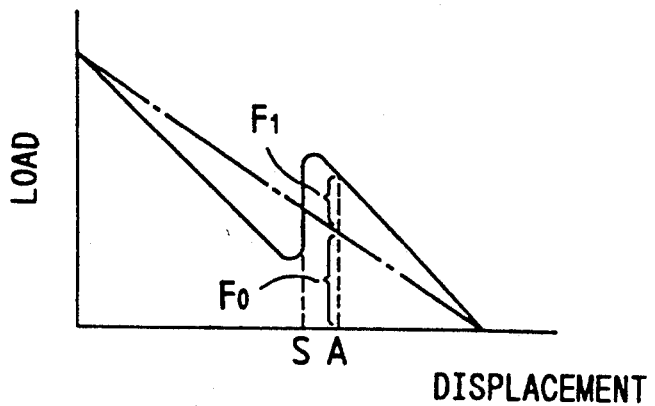
FIG. 9 is a synthetic diagram of the characteristic diagram of FIG. 8.

FIG. 9 is a synthetic diagram of FIG. 8 in which the load at each displacement is obtained by subtracting the resistance load of the flat spring 1 from the generation load of the piezo-electric element 2. Before the deflection of the flat spring 1 reaches its snap action point S, the synthetic load is smaller than that in the case of solely using the piezo-electric element because the load of the piezo-electric element is canceled with the load of the flat spring 1. When the snap action point S is exceeded, the synthetic load becomes larger than the load in the case of solely using the piezo-electric element shown by a one-dot chained line because the load of the flat spring 1 is added to the load of the piezo-electric element 2.

Consequently, when the load is taken out from the free end of the flat spring 1 at a point, for example, a point A, where the snap action point S is exceeded, it is possible to obtain a larger force by $F_1$ than $F_0$ in the case of solely using the piezo-electric element.

Figure 10:
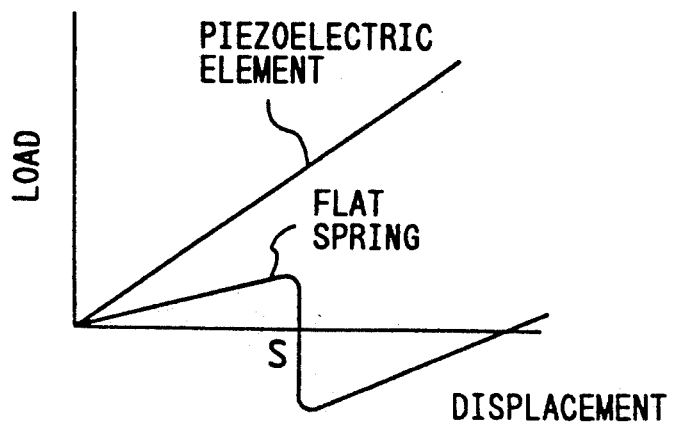
FIG. 10 is a characteristic diagram showing the relation between displacement and load with respect to the piezo-electric element and the flat spring when a voltage is removed after it is applied to the actuator of FIG. 1.
Figure 11:
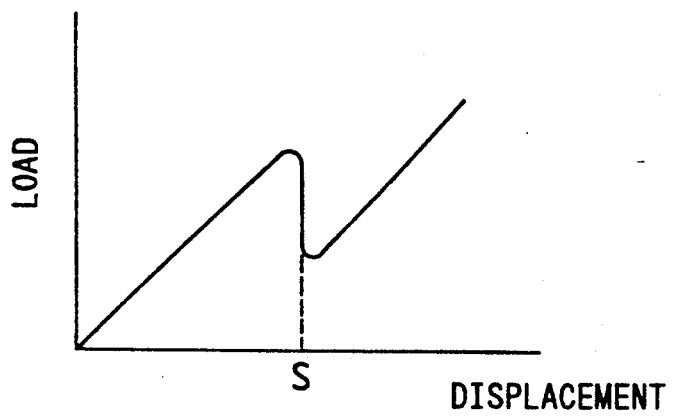
FIG. 11 is a synthetic diagram of the characteristic diagram of FIG. 10.

FIGS. 10 and 11 show the relationship between displacement when an applied voltage is removed in the curved state of the piezo-electric element 2 and load when the flat spring 1 is returned to the initial state, in which FIG. 10 shows the relation with respect to the piezo-electric element 2 and the flat spring 1 and FIG. 11 is a synthetic diagram thereof.

In FIG. 10, the load of the piezo-electric element 2 becomes maximum at the maximum displacement point where the piezo-electric element 2 is restricted in the curved state and becomes zero when the displacement is returned to zero. The direction of the load of the flat spring 1 opposes the restoration load of the piezo-electric element 2 before the flat spring 1 returns from the maximum displacement point to the snap action point S; however, the value of the load is smaller than the load of the piezo-electric element 2. Consequently, the synthetic load is always positive as shown in FIG. 11, and when the voltage is removed, the piezo-electric element 2 inverts the flat spring 1 so as to automatically return to the initial state.

Figure 12:
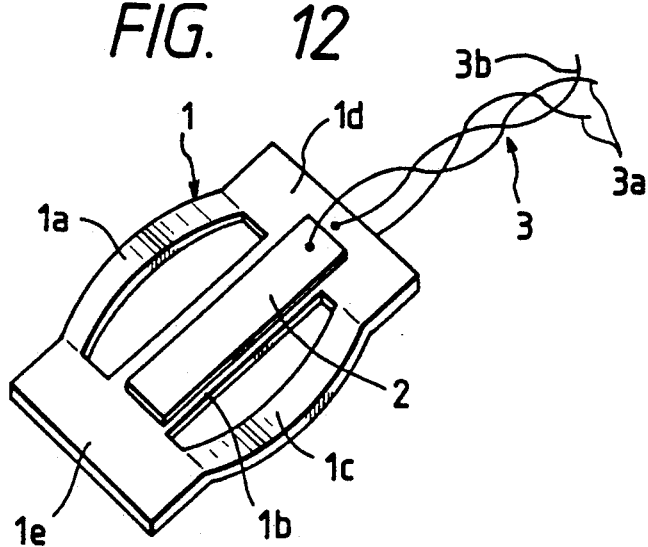
FIG. 12 is a perspective view showing another embodiment of the present invention.
Figure 13:
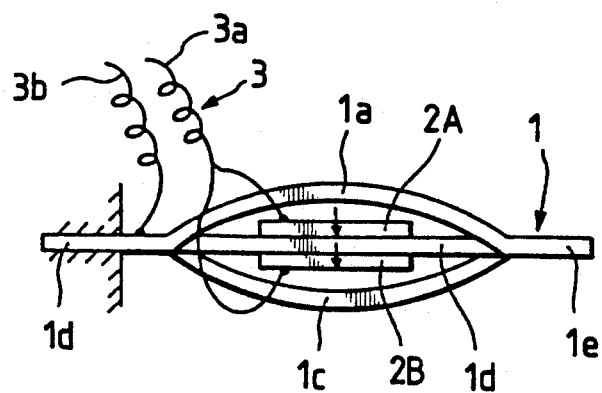
FIG. 13 is a side view of the actuator of FIG. 12 having a fixed end.

FIGS. 12 and 13 show an embodiment of the bi-directional piezo-electric actuator, in which FIG. 12 is a perspective view and FIG. 13 is a side view in which one end 1e of a flat spring 1 is fixed and a free end 1e is made to be an operating end portion.

In this embodiment, the curved directions of the left and right beams 1a and 1c of the flat spring 1 are opposite to each other and piezo-electric elements 2 (2A and 2B) are bonded on the opposite surfaces of the central beam 1b. The piezo-electric elements 2A and 2B are polarized in the opposite direction with respect tot he flat spring 1 as shown by arrows in FIG. 13. One lead wire 3a is commonly connected to electrodes of the piezo-electric elements 2A and 2B at the side opposite to the flat spring 1 while the other lead wire 3b is commonly connected to the flat spring.

Figure 14:
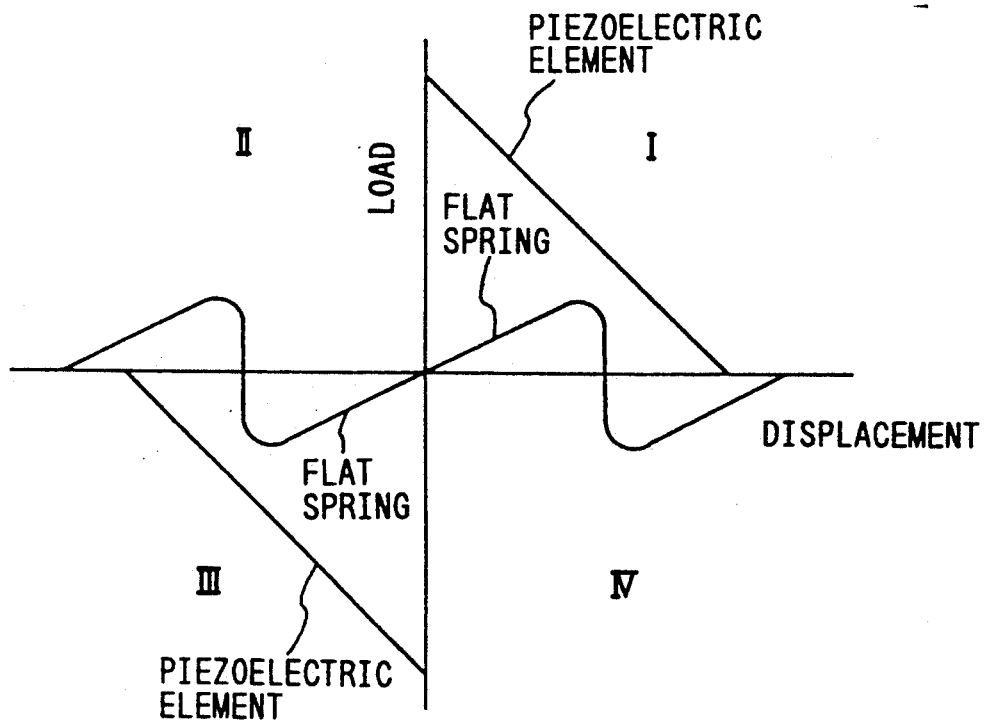
FIG. 14 is a characteristic diagram showing the relation between displacement and load with respect to the piezo-electric element and the flat spring upon application of a voltage to the actuator of FIG. 13.
Figure 15:
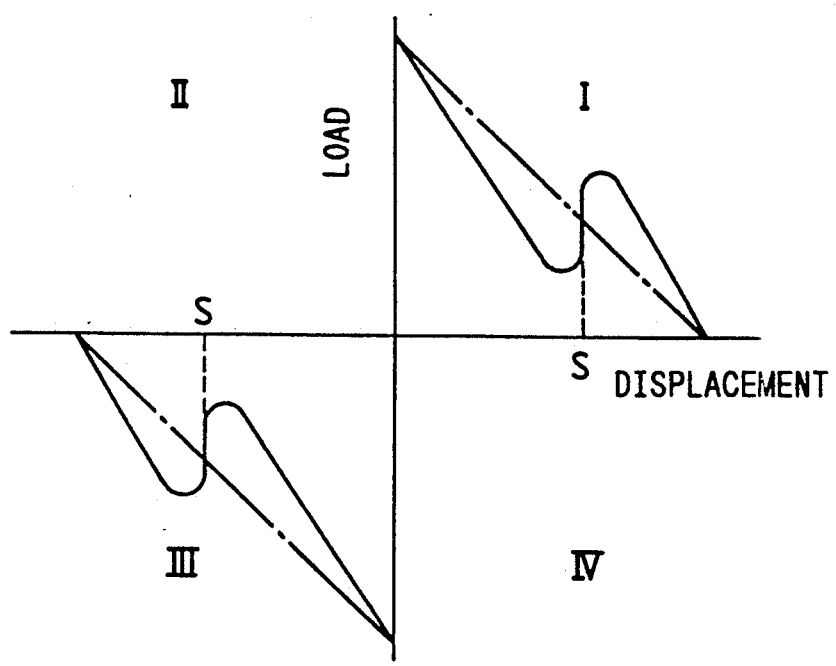
FIG. 15 is a synthetic diagram of the characteristic diagram of FIG. 14.

FIG. 14 is a characteristic diagram showing the relation between the load and the displacement with respect to the piezo-electric elements 2A and 2B and the flat spring 1 in the above bi-directional piezo-electric actuator, and FIG. 15 is a synthetic diagram thereof.

When a voltage is applied to the actuator of FIG. 13 so that the electric potential of the lead wire 3a is positive with respect to that of the lead wire 3b, the piezo-electric element 2B contracts in the thickwise direction and expands in the longitudinal direction, while the piezo-electric element 2A expands in the thickwise direction and contracts in the longitudinal direction. As a result, the piezo-electric elements 2A and 2B and the flat spring 1 are deflected to be concave downward in FIG. 13 and the free end 1e is displaced downward. The characteristic at that time is shown in the quadrants I and IV of FIGS. 14 and 15.

If the electric potential of the voltage to be applied is inverted, the foregoing deflection is concave upward, and the characteristic at the time is shown in the quadrants II and III of FIGS. 14 and 15.

A change of load and displacement in each process of deflection is the same as that in the case of the embodiment of FIG. 1 and therefore explanation thereof is omitted. In this case, as shown in FIG. 15, a larger force than that in the case of solely using the piezo-electric elements 2A and 2B shown by one-dot chained lines is obtained in the bi-directions after the snap action point S.

Figure 16:
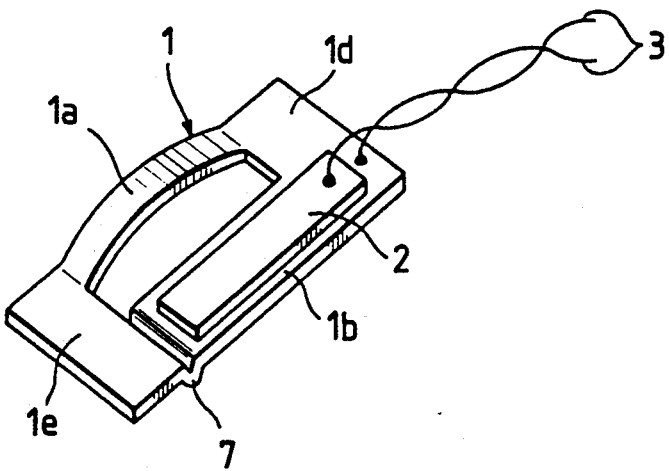
FIG. 16 is a perspective view showing a further embodiment of the present invention.

FIG. 16 shows an embodiment in which only one curved beam 1a is provided. In this embodiment, in order to curve the beam 1a, an end portion 7 of a beam 1b is squeezed as shown in the drawing so that the length of the beam 1b is shortened. The configuration except the foregoing point and the operation are substantially the same as those of the embodiment of FIG. 1 and therefore explanation thereof is omitted.

Figure 17:
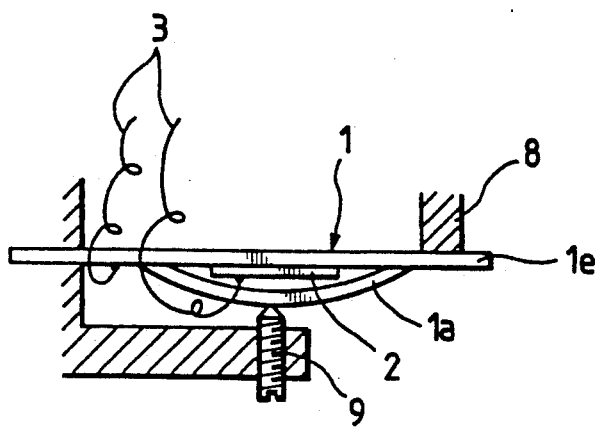
FIG. 17 is a side view of a further embodiment having means for adjusting a snap action point.
Figure 18:
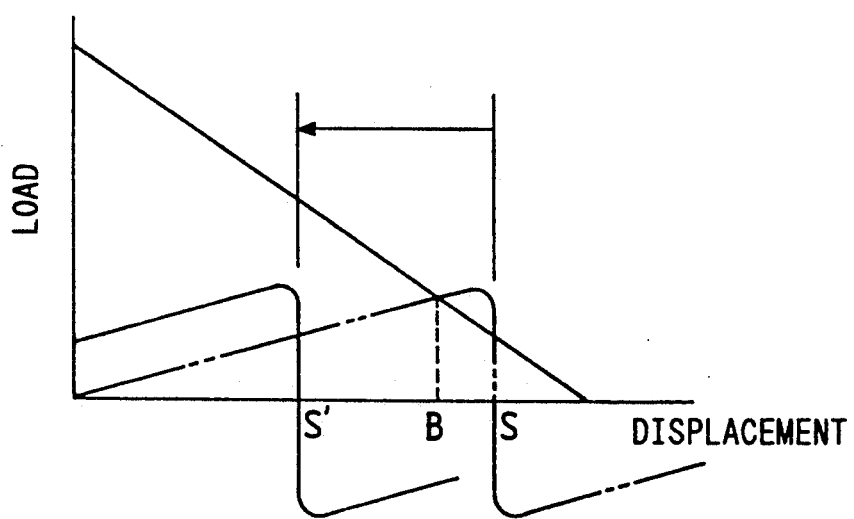
FIG. 18 is a characteristic diagram showing the relation between displacement and load with respect to the piezo-electric element and the flat spring upon application of a voltage to the actuator of FIG. 17.

FIG. 17 shows an embodiment having means for adjusting the snap action of a flat spring 1. FIG. 18 is a characteristic diagram showing the relation between displacement and load.

As shown by a two-dot chained line in FIG. 18, assuming that the snap action point of the flat spring 1 exists in a point S and the respective loads of a piezoelectric element 2 and the flat spring 1 are balanced with each other at a point B before the point S as shown in the drawing, the snap action (inversion) of the flat spring 1 becomes impossible and the operation is stopped at this point.

In such a case, a central portion of a curved beam 1a is slightly pushed up by using an adjustment screw 9 while pushing a free end 1e by using a stopper 8 as shown in FIG. 17 so that the snap action point is moved to the position before the point S, for example, to a point S' of FIG. 18. As a result, the load of the piezo-electric element 2 exceeds that of the flat spring 1 at the snap action point (the point S'-) so that the snap action can be performed.

According to the present invention, the pulse generation element has a structure that the piezo-electric element is affixed to a part of the flat spring having a snap action characteristic, so that mechanical movement of the piezo-electric element can be easily converted into an electric signal while using the advantage of the piezo-electric element in that no external power source is required, and for example, a push-button switch of the pulse generation system can be produced inexpensively.

According to the present invention, the actuator is constituted by a combination of the piezo-electric element and the flat spring having a snap action characteristic. Therefore, since the spring force of the flat spring inverted at the snap action point is added to the load of the piezo-electric element, a large force can be generated at a large displacement point without externally providing any mechanism for increasing the load.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A piezo-electric actuator, comprising:
   a flat spring having a plurality of arched side beams, the arched side beams having first and second ends, a central beam having first and second ends and top and bottom surfaces and disposed between the arched side beams, a first end portion connecting the first end of the central beam with the first ends of the plurality of arched side beams, and a second end portion connecting the second end of the central beam with the second ends of the plurality of arched side beams, wherein the arched side beams and the central beam are parallel to each other; and
   a piezo-electric element affixed to the bottom surface of the central beam.

2. The piezo-electric actuator of claim 1, wherein the arches of the arched side beams extend in the same direction.

3. The piezo-electric actuator of claim 1, wherein the arches of the arched side beams extend in opposite directions.

4. The piezo-electric actuator of claim 1, wherein a plurality of laminated piezo-electric elements are affixed to the central beam of the flat spring.

5. The piezo-electric actuator of claim 3, further comprising a second piezo-electric element affixed to the top surface of the central beam of the flat spring.

6. A piezo-electric actuator, comprising:
   a flat spring including an arched beam having first and second ends, a flat beam having first and second ends, a first end portion connecting the first end of the arched beam with the first end of the flat beam, and a second end portion connecting the second end of the arched beam with the second end of the flat beam, the arched beam and the flat beam being substantially parallel to each other; and
   a piezo-electric element affixed to the flat beam of the flat spring.

7. The piezo-electric actuator of claim 6, further comprising means for adjusting a snap action characteristic of the flat spring.

8. The piezo-electric actuator of claim 7, wherein the adjusting means comprises an adjustment screw which engages the arch of the arched beam and a stopper which limits the movement of the second end portion.

* * * * *